A. J. HALL.
SYSTEM OF CONTROL.
APPLICATION FILED FEB. 10, 1916.

1,264,297.

Patented Apr. 30, 1918.
4 SHEETS—SHEET 2.

INVENTOR
Arthur J. Hall.
BY
ATTORNEY

WITNESSES:

A. J. HALL.
SYSTEM OF CONTROL.
APPLICATION FILED FEB. 10, 1916.

1,264,297.

Patented Apr. 30, 1918.
4 SHEETS—SHEET 3.

Fig 5  Series Acceleration

Fig 6  Parallel Acceleration

Fig 7.  Parallel Regeneration

WITNESSES:
F. R. Krear
W. P. Coley

INVENTOR
Arthur J. Hall
BY
Wesley G. Carr
ATTORNEY

# UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,264,297.   Specification of Letters Patent.   Patented Apr. 30, 1918.

Application filed February 10, 1916. Serial No. 77,429.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Systems of Control, of which the following is a specification.

My invention relates to systems of control and especially to the regenerative control of electric railway motors and the like.

One object of my invention is to provide a system of the above-indicated character which shall be relatively simple and inexpensive in construction and effective and reliable in operation and which shall embody the usual advantages of regenerative control, such as economy of energy and wear of brake shoes, etc.

Another object of my invention is to provide a system of the class under consideration wherein switching means including a variable resistor is employed in the customary manner for providing "shunting" transition of the accelerating motors from series to parallel relation and for effecting a "bridging" regenerative transition of the momentum-driven machines from parallel to series relation, as hereinafter more fully set forth.

My invention may best be understood by reference to the accompanying drawings, wherein.

Figure 1:
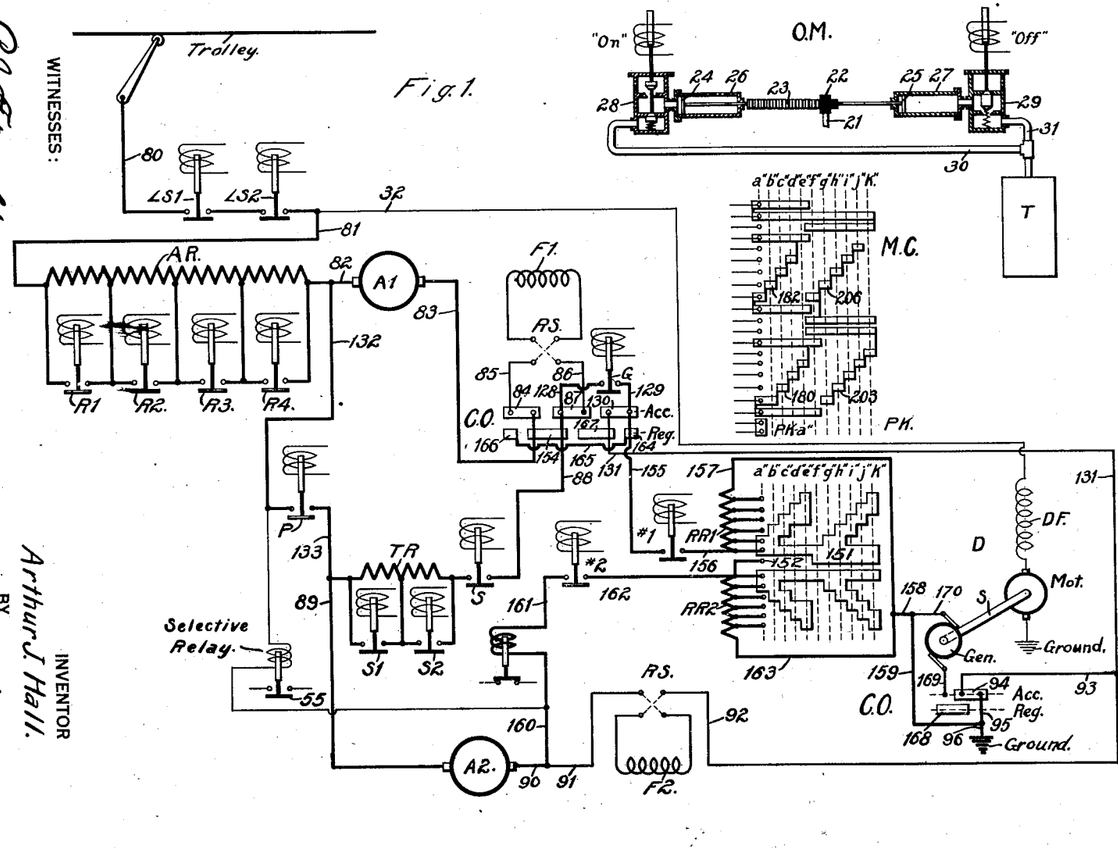
Figure 1 is a diagrammatic view of the main circuits of a system of control embodying my invention.

Referring to Fig. 1 of the drawings, the system shown comprises a plurality of suitable supply-circuit conductors respectively marked "Trolley" and "Ground;" a plurality of dynamo-electric machines respectively having armatures A1 and A2 and field-magnet windings F1 and F2 of the series type; the machines being adapted for both accelerating and regenerative operation; a reversing switch RS that is preferably of a familiar electrically-controlled type, here shown in a simplified conventional manner, for the usual purpose of reversing the electrical relations of the main armatures and field windings; an accelerating resistor AR that is adapted to be short-circuited in sections by a plurality of suitable electrically-controlled switches R1 to R4, inclusive; an auxiliary resistor TR that is employed during the transition of the regenerative machines from parallel to series relation in a manner to be described; a plurality of motor-controlling switches LS1, LS2, S, P, and G; a plurality of similar switches S1 and S2 that are associated with the resistor TR and the switch S, as hereinafter set forth; a two-position change-over switch CO, preferably of the drum type, for arranging certain of the main and of the auxiliary circuits during both the accelerating and the regenerative periods; a plurality of switches #1 and #2 that are employed only during regeneration of the machines; a plurality of variable resistors RR1 and RR2 that are adapted to be varied in value by a controlling device PK, as set forth later; a dynamotor or motor-generator set D that is employed, among other things, for exciting the main field windings during the regenerative period; and a relay device L and a selective relay that are employed during regeneration for purposes to be described.

The change-over switch CO is adapted to occupy two positions respectively marked "Acc." and "Reg.," standing for acceleration and regeneration, respectively, and is preferably of a familiar electrically-controlled type, as described later in connection with Fig. 2. It will be understood that although for the sake of simplicity and clearness the various contact members of the change-over switch are disposed in various positions of Fig. 1 and of Fig. 2, the contact members are in reality arranged in accordance with the customary practice, that is, all the control fingers are disposed in one or more rows on a control drum. Inasmuch as such drum type construction is old and familiar in the art, no further description or illustration of the change-over switch is believed to be necessary.

The controlling device PK comprises a lower section whereon are disposed suitable stationary control fingers and movable contact segments for varying the active values of the resistors RR1 and RR2 during the regenerative period and an upper section whereon are located a plurality of auxiliary control fingers and contact segments for partially controlling the operating mechanism OM of the controlling device. The device PK is adapted to occupy a plurality of positions $a''$ to $k''$, the first five positions corresponding to parallel operation of the regenerating machines and the remaining six positions corresponding to subsequent series operation thereof.

The operating mechanism OM is of a familiar electrically-controlled, pneumatically-actuated type and comprises a suitable shaft or axle 21 that is secured to the controlling device PK to effect rotative movement thereof; a pinion 22 that is secured to the end of the shaft 21 and is adapted to mesh with a suitable rack member 23; a plurality of piston members 24 and 25 that are secured to the respective ends of the rack member 23 and are adapted to operate within suitable cylinders 26 and 27, respectively; a plurality of valves 28 and 29 that are adapted to admit fluid pressure to the cylinders from a suitable reservoir or tank T through pipes or passages 30 and 31, respectively, under predetermined conditions; and a plurality of actuating coils respectively marked "On" and "Off" for governing the action of the valves 28 and 29, respectively.

The valve 28 is normally closed to exclude fluid pressure from the cylinder 26 and to connect the cylinder with the atmosphere and is adapted to admit fluid pressure to the cylinder 26 only when the actuating coil "On" is energized. On the other hand, the valve 29 is normally opened to admit fluid pressure to the cylinder 27 which normally does not communicate with the atmosphere, and only when the actuating coil "Off" is energized, is fluid pressure exhausted from the cylinder 27 to the atmosphere. Consequently, unbalanced pressure conditions normally obtain on the outer faces of pistons 24 and 25, whereby the controlling device PK is normally biased to its initial position $a''$.

To effect operation of the device PK through its successive positions, the actuating coils "On" and "Off" are simultaneously energized, whereby the above-mentioned fluid-pressure conditions are unbalanced in the reverse manner, and the rack member 23 is actuated toward the right, as shown in the drawing. To arrest the movement of the device PK at any desired position, the actuating coil "Off" is deënergized, thereby establishing balanced fluid-pressure conditions in the cylinders 26 and 27 and bringing the device to a positive and reliable stop. To effect the return of the controlling device to its initial position, it is merely necessary to deënergize both of the actuating coils, whereupon the normal unbalanced fluid-pressure conditions obtain in the cylinder to actuate the operating mechanism and the device PK toward its normal position $a''$.

The motor-generator set or dynamotor D is shown as comprising a motor armature Mot. and a generator or exciting armature Gen. which may be mechanically associated with the armature Mot. in any suitable manner, as by a shaft $s$; and a suitable field-magnet winding DF may be connected in a circuit that is established from the supply-circuit-connecting switch LS2, through conductor 32, the field winding DF and the armature Mot. to the negative conductor, ground. It will be understood that the dynamotor may be employed for any other desired purposes in addition to the function, to be set forth later, of energizing the main field windings F1 and F2 during regeneration.

Figures 2, 3, 4:
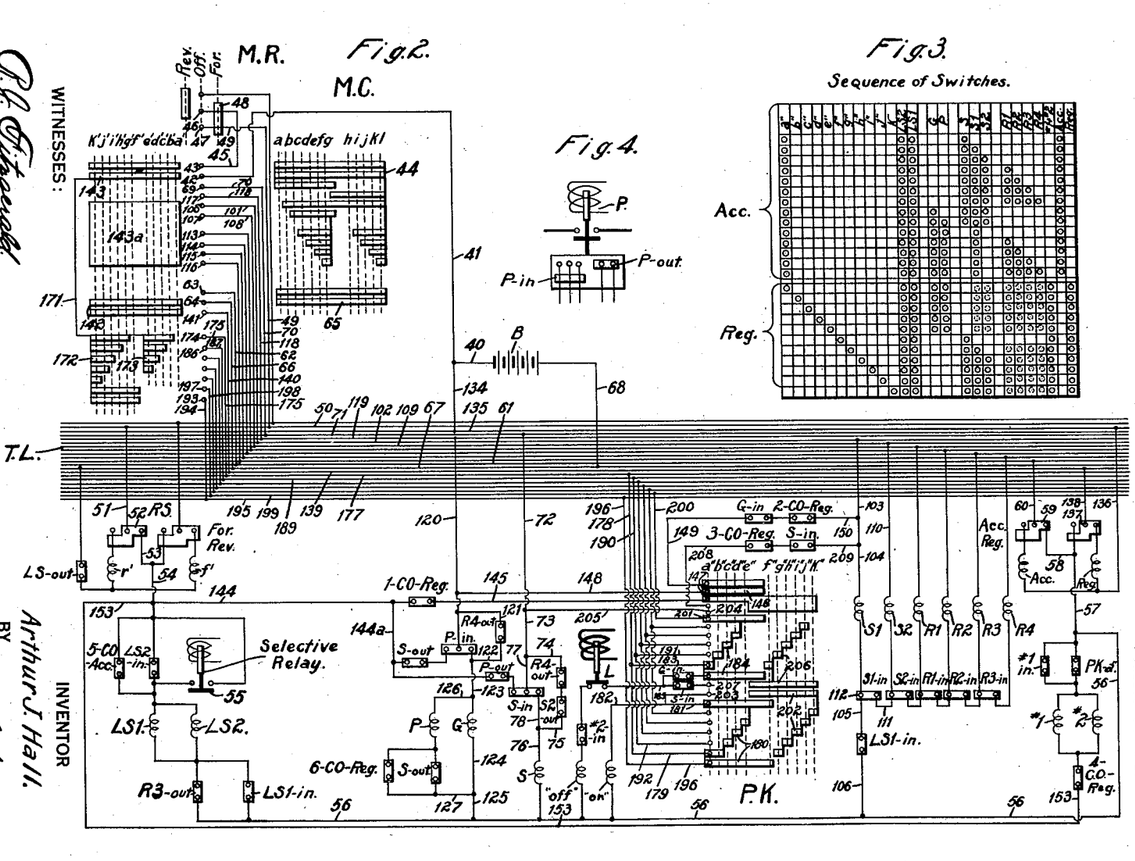
Fig. 2 is a diagrammatic view of the auxiliary governing circuits for manipulating the various switching devices that are shown in Fig. 1 in accordance with the sequence chart of well-known form that is shown in Fig. 3.
Fig. 4 is a detailed diagrammatic view of a complete switch that is employed in the system of Fig. 1.

Reference may now be had to Fig. 2 wherein, in addition to the actuating coils of the various switching devices and the upper section of the device PK that are shown in Fig. 1, the system illustrated comprises a plurality of electrical interlocking contact members of a familiar type that are associated with and adapted to be actuated by the respectively designated switches in accordance with the well-known construction that is illustrated in Fig. 4; a master controller MC that is adapted to occupy a plurality of operative positions $a$ to $l$, inclusive, when operated in a direction that corresponds to acceleration of the motors, and is adapted to occupy a plurality of operative positions $a'$ to $k'$ when actuated from an intermediate "off" position in the opposite direction that corresponds to regenerative operation of the machines; a master reverser MR of a familiar type that is adapted to occupy an "off," a forward and a reverse position and that is associated with the actuating coils of the main reversing switch RS in a well-known manner; the auxiliary contact members of the relay device L and of the selective relay; a suitable source of energy, such as a battery B, for the actuating coils; and a plurality of train-line conductors TL for the familiar purpose of enabling my invention to be employed in connection with the multiple-unit control of electric railway trains.

Assuming that it is desired to effect acceleration of the motors and that the master reverser MR and the main reversing switch RS occupy their respective forward positions, the master controller MC may be moved to its initial operative position $a$, whereby a circuit is established from one terminal of the battery B, through conductors 40 and 41, control fingers 42 and 43 which are bridged by contact segment 44 of the master controller, conductor 45, control fingers 46 and 47 which are bridged by contact segments 48 of the master reverser in its forward position, conductor 49, train-line conductor 50, conductor 51, contact member 52 of the main reversing-switch RS in its forward position, conductors 53 and 54, contact member 5—CO—Acc. of the change-over switch in its accelerating position, the parallel-connected actuating coils of the switches LS1 and LS2, interlock R3—out, conductors 56, 57 and 58, contact member 59 of the change-over switch, conductor 60, train-line conductor 61, conductor 62, control fingers 63 and 64 which are bridged by contact segment 65 of the master controller, conductor 66, train-line conductor 67 and conductor 68 to the opposite terminal of the battery B. As soon as the switches LS1 and LS2 are closed, a "holding circuit" for their actuating coils is formed by the bridging of interlock R3—out by interlock LS1—in.

Another circuit is simultaneously established from the contact segment 44 of the master controller through control finger 69, conductor 70, train-line conductor 71, conductors 72, 73 and 74, interlocks R4—out and S2—out, conductors 75 and 76 and the actuating coil of the switch S to the negative conductor 56. Upon the closure of the switch S, a "holding circuit" for its actuating coil is established from conductor 73 through conductor 77, interlock S—in and conductor 78, which is connected to conductor 76.

Figure 5:
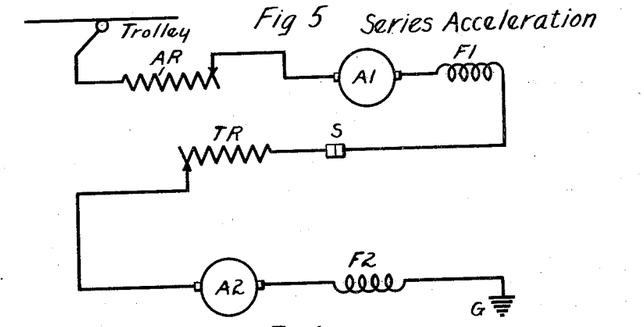
Fig. 5 to Fig. 9, inclusive, are simplified diagrammatic views of various main-circuit connections, as denoted by the accompanying legends.

Referring for the time being to Fig. 1, it will be seen that a main circuit has thus been established from the trolley through conductor 80, switches LS1 and LS2, conductor 81, the entire accelerating resistor AR, conductor 82, main armature A1, conductor 83, contact member 84 of the change-over switch in its accelerating position, conductor 85, certain contact members (not shown) of the reversing switch RS, main field winding F1, other contact members (not shown) of the reversing switch, conductor 86, contact member 87 of the change-over switch, conductor 88, switch S, resistor TR, conductor 89, main armature A2, conductors 90 and 91, reversing switch RS, main field winding F2, reversing switch RS, conductors 92 and 93, contact member 94 of the change-over switch CO, and conductors 95 and 96 to the negative conductor ground. (See Fig. 5.)

Referring again to Fig. 2, if the master controller MC is actuated to its second position b, a circuit is established from the contact segment 44, through control finger 100, conductor 101, train-line conductor 102, conductors 103 and 104, the actuating coil of the switch S1, conductor 105, interlock LS1—in and conductor 106 to the negative conductor 56, whereby a portion of the resistor TR is short-circuited to effect a predetermined degree of acceleration of the motors.

Upon the movement of the master controller to its position c, a circuit is completed from the contact segment 44 through control finger 107, conductor 108, train-line conductor 109, conductor 110, actuating coil of the switch S2, conductor 111, interlock 112—S1—in, and thence through conductor 105, in accordance with the circuits already traced, whereby the remaining section of the resistor TR is excluded from circuit.

In the succeeding positions d to g, inclusive, of the master controller, the contact segment 44 engages control fingers 113 to 116, respectively, whereby the actuating coils of the switches R1, R2, R3 and R4 are successively energized in a manner that corresponds to that just recited in connection with the switch S2, and the main accelerating resistor AR is thus gradually short-circuited to connect the motors in full series relation.

To effect "shunting" transition of the motors from series to parallel relation, the master controller may be moved from position g toward position h, whereby the actuating coils of the switches R1 to R4, inclusive, are first deënergized by reason of the disengagement of the corresponding control fingers from the contact segment 44, while a circuit is substantially simultaneously completed from the contact segment 44 through control finger 117, conductor 118, train-line conductor 119, conductors 120 and 121, interlock R4—out, conductors 122 and 123, interlock R4—out, conductors 122 and 123, the actuating coil of the switch G and conductors 124 and 125 to the negative conductor 56. The control fingers 69 and 107 then become disengaged from the contact segment 44, thereby opening the switches S and S2, whereupon, a further circuit is completed from the conductor 123 through conductor 126, the actuating coil of the switch P, interlock S—out and conductors 127 and 125 to the negative conductor 56. Upon the closure of switch P, a "holding circuit" for the actuating coils of the switches G and P is formed by the bridging of the interlock R4—out by an interlock P—in.

Figure 6:
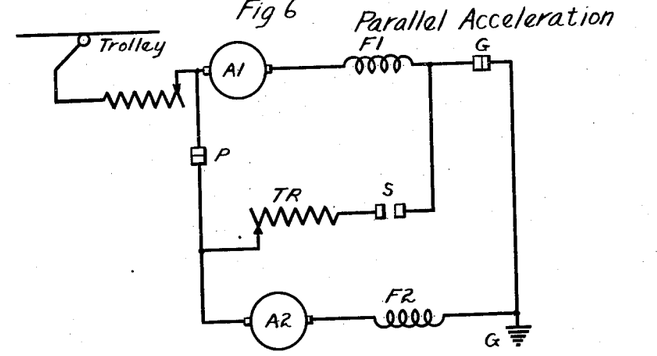

Referring to Fig. 1 temporarily, one circuit is thus established from contact member 87 of the change-over switch CO through conductor 128, switch G, conductor 129, contact segment 130 of the change-over switch and conductor 131 to the negatively-connected conductor 93. Thus, the motor having the armature A2 is temporarily short-circuited through switches S and G until the switch S is opened; and as soon as the switch P has been closed, a circuit is completed from the lower-voltage terminal of the accelerating resistor AR, through conductor 132, switch P and conductors 133 and 89 to the higher-voltage terminal of the armature A2. In this way, the motor having armature A2 is connected in parallel relation with the other motor, the lower-voltage terminal of which is connected to ground by the closure of the switch G. (See Fig. 6.)

Resuming the description of Fig. 2, the actuation of the master controller MC through its positions $i$ to $l$, inclusive, the control fingers 113 to 116 again respectively engage the contact segment 44, whereby the various sections of the accelerating resistor AR are successively short-circuited in a manner similar to that already set forth, and the motors are thus disposed in full parallel relation.

Assuming that it is desired to effect regeneration of the momentum-driven dynamo-electric machines, the master controller MC, after being returned to its "off" position to effect the opening of the switches, may be actuated to its initial regenerative position $a'$, whereupon a circuit is first established from the positive battery conductor 40 through conductor 134, train-line conductor 135, conductor 136, coil "Reg." of the change-over switch CO, contact member 137 thereof in the accelerating position, conductor 138, train-line conductor 139, conductor 140, control fingers 141 and 64 which are bridged by contact segment 142 of the master controller, conductor 66, train-line conductor 67 and conductor 68 to the opposite battery terminal. The drum-type change-over switch CO is thus actuated to its position "Reg.," whereupon the circuit of the recently employed actuating coil is broken at the contact segment 137.

It will be observed that the control fingers 100, 107, and 113 to 116, inclusive, are short-circuited by contact segment 143ª throughout the regenerative operation, the reason for such an arrangement being that the progressive closure of the switches S1 to R4, inclusive, is dependent upon the prior closure of the switch LS1, by reason of the interlock LS1—in that is included between conductors 105 and 106, while the closure of the switch LS1 is, in turn, dependent upon the actuation of the selective relay to its upper or closed position, such actuation taking place only after the voltage of the regenerating machines exceeds the supply-circuit voltage by a predetermined value. The location of the selective relay is such that, provided the initial coasting speed of the momentum-driven machines is sufficient, in conjunction with the variable field excitation, to effect parallel regeneration of the armatures, the machines will be connected in parallel-circuit relation; whereas, if the combination of speed and field excitation cannot be made to produce a voltage that is higher than the supply-circuit voltage in each machine, then the selective relay will act to initially dispose the machines in series relation and thus return regenerative energy to the supply circuit. However, such selective relay connections form no part of my present invention except inasmuch as they perform a certain function in connection therewith, and are fully set forth and claimed in a co-pending application of L. M. Perkins, Serial No. 83,724, filed March 13, 1916, and assigned to the Westinghouse Electric & Manufacturing Company. It will be understood that any other suitable means for connecting the regenerating machines to the supply circuit under proper conditions may be employed.

Another circuit is established from the positive battery conductor 41, through control fingers 42 and 43 which are bridged by contact segment 143 of the master controller, conductor 45, thence to conductor 54 in accordance with the circuits already traced in connection with the acceleration of the motors, and thence through conductor 144, contact member 1—CO—Reg., conductor 145, the auxiliary contact segment 148 of the controlling device PK, conductors 147, 146 and 121, interlock R4—out, conductors 122, and 123, and thence through the actuating coil of the switch G, as already set forth, and through conductor 126, the actuating coil of the switch P, contact member 6—CO—Reg., and conductor 127 to conductor 125.

A further circuit is simultaneously established from the conductor 54 through conductor 153, contact member 4—CO—Reg., the parallel-connected actuating coils of the switches #1 and #2, contact member PK—$a''$ of the controlling device PK in its initial position, conductor 57, contact member 137 of the change-over switch CO in its position "Reg.", and thence through conductor 138 to the opposite battery terminal. Upon the closure of switch #1, a "holding circuit" for the actuating coils of switches #1 and #2 is formed by the bridging of contact member PK—$a''$ by an interlock #1—in.

Tracing the main circuits initially established, one circuit, indicated by solid arrows, is completed from the lower-voltage terminal of the resistor AR through conductor 82, main armature A1, conductor 83, contact member 154 of the change-over switch in its position "Reg.", conductor 128, switch G, conductors 129 and 155, switch #1, conductor 156, resistor RR1 and conductors 157, 158, 159 and 96 to the negative conductor, ground.

Figure 7:
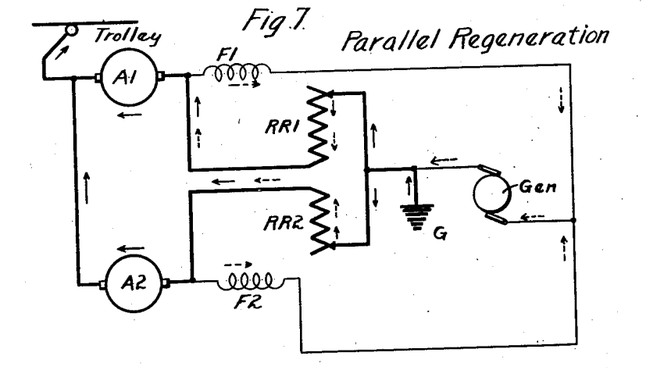

A similar circuit is simultaneously completed from the conductor 82, through conductor 132, switch P, conductors 133 and 89, main armature A2, conductors 90 and 160, the actuating coil of the relay device L, conductor 161, switch #2, conductor 162, resistor RR2, and conductor 163 to the negatively-connected conductor 158. A pair of parallel circuits respectively including the armature A1 and the resistor RR1 and the armature A2 and the resistor RR2, are thus established. (See Fig. 7.)

One field-winding circuit, indicated by dotted arrows, is completed from the switch G through conductor 129, contact member 164, conductor 165 and contact member 166 of the change-over switch CO, conductor 85, field winding F1, conductor 86, contact member 167 of the change-over switch, conductors 131 and 93, contact member 168 of the change-over switch, conductor 169, the armature Gen. of the dynamotor, conductor 170 and conductors 159 and 96 to ground.

The other field-winding circuit is completed from the armature A2, through conductors 90 and 91, the field winding F2, conductors 92 and 93, and thence through the generator armature to ground, as just recited. The field windings F1 and F2 are thus connected in series relation with the common generator armature across the respective resistors RR1 and RR2 throughout the regenerative period. (See Fig. 7).

Referring again to Fig. 2, when the master controller MC is actuated to its second position $b'$, a circuit is completed from the control finger 43, through contact segment 143, conductor 171, contact segments 172 and 173 of the master controller, control finger 174, conductor 175, train-line conductor 177, conductors 178 and 179, auxiliary contact segment 180 of the controlling device PK, conductors 181 and 182 and the actuating coil "On" of the valve 28 to the negative conductor 56.

Another circuit is simultaneously completed from conductor 178, through conductor 183, auxiliary contact segment 184 of the controlling device PK, interlock G—in, conductor 185, auxiliary contact members of the relay device L in its lower or operative position, interlock #2—in and the actuating coil "Off" of the valve 29.

Since both of the actuating coils operating mechanism OM are thus simultaneously energized, the controlling device PK is gradually moved through its successive positions, in the manner described below, until the field excitation of the momentum-driven machines, in conjunction with the speed thereof, is sufficient to generate a voltage in the machines, either in parallel or in series relation, that exceeds the supply-circuit voltage by a predetermined amount, whereupon the selective relay is actuated to its upper position to complete a circuit from the conductor 54 through auxiliary contact members 55 of the selective relay, the parallel-connected actuating coils of the switches LS1 and LS2 and interlock R3—out to the negative conductor 56, whereby the machines are connected to the supply-circuit conductors. Upon the closure of switch LS2, an interlock LS2—in bridges the auxiliary contact members 55 of the selective relay, thereby insuring the continued closure of the switches LS1 and LS2.

For the purposes of the present specification, let it be assumed that conditions are suitable to initially connect the machines in the parallel relation that has been described. The action of the controlling device PK is normally intermittent and is dependent upon the master controller MC. For example, as soon as the device PK has moved to its second position $b''$, the conductor 183 becomes disconnected from the contact segment 184, thereby deënergizing the "Off" actuating coil and arresting the movement of the device, in a manner already described. The "On" actuating coil, however, is still energized by reason of the continued connection between conductor 179 and contact segment 180.

Upon actuation of the master controller to its position $c'$, a circuit is completed from the positively energized contact segment 173, through control finger 186, conductor 187, train-line conductor 189, conductor 190 and conductor 191 which is connected to contact segment 184 in position $b''$ of the device PK. The two actuating coils are thus again simultaneously energized, and movement of the control drum to its position $c''$ is effected, whereupon the connection between conductor 191 and contact segment 184 is interrupted to effect the holding of the device PK in the position $c''$. The circuit of the actuating coil "On" is maintained by reason of the connection of conductor 192, which is joined to conductor 190, to contact segment 180 before the connection of conductor 179 with the contact segment is interrupted.

By actuating the master controller through positions $d'$ and $e'$, a similar operation is repeated, by reason of the engagement of the contact segment 173 of the master controller with certain control fingers in succession, whereby the controlling device PK is actuated through its successive positions in the step-by-step manner described above.

Such actuation of the controlling device PK excludes certain sections of the resistors RR1 and RR2 from circuit, as will be observed by reference to Fig. 1 and, as already mentioned, when conditions are suitable, the selective relay device acts to effect the closure of the switches LS1 and LS2. Upon the closure of the switch LS1, a circuit is completed from the contact segment 146 of the device PK through conductor 149, interlock G—in, contact member 2—CO—Reg., conductors 150 and 104, the actuating coil of the switch S1, conductor 105, interlock LS1—in and conductor 106 to the negative conductor 56.

Inasmuch as all of the control fingers of the master controller that are associated with the actuating coils S1 to R4, inclusive, are short-circuited by the contact segment 130

143ª and, inasmuch as the positively energized conductor 150 is connected through conductor 103, etc., to the segment 143ª, it follows that all of the above-mentioned actuating coils are energized successively as soon as the interlock LS1—in connects the conductors 105 and 106. Since the closure of the switch LS1 may occur at practically any position of the controlling device PK, as already explained, the switches in question, consequently, may close at any corresponding time and have no definite period of closure with respect to the positions of the master controller MC. Therefore, in the sequence chart of Fig. 3, the circles that correspond to the switches under consideration are dotted to indicate that the switches do not necessarily close at a predetermined time.

The generating machines being now connected in full parallel relation, which corresponds to position $e'$ of the master controller and $e''$ of the controlling device PK, to effect parallel-series transition of the machines, the master controller may be actuated to its position $f'$, whereupon the contact segment 173 first becomes disengaged from the corresponding control fingers and then one circuit is completed from the positively energized contact segment 172 through control finger 193, conductor 194, train-line conductor 195, conductor 196 and the contact segment 180 to the actuating coil "On", whereby the energization thereof is maintained during the movement of the device PK from position $e''$ to position $f''$; while a similar circuit is completed from the contact segment 172, through control finger 197, conductor 198, train-line conductor 199, conductor 200 and control finger 201 which is connected to the contact segment 184, thereby again energizing the actuating coil "Off" and thus effecting the actuation of the controlling device PK to its initial series position $f''$, wherein the connection between the control finger 201 and contact segment 184 is interrupted to temporarily hold the device PK in the position $f''$.

During the above-recited actuation of the device PK, a circuit is established from the conductor 179, which makes connection with a contact segment 202 just prior to the time that the contact segment 180 becomes disconnected from the conductor 196, thereby maintaining the energization of the actuating coil "On", whence circuit is completed through control finger 203 to the conductor 182 and the actuating coil "On".

Another circuit is simultaneously established from the contact segment 146 of the device PK through control finger 204, conductors 205, 73 and 74, as far as the interlock R4—out. This circuit is completed as soon as the switch R4 opens, as is about to be described, through the above-mentioned interlock R4—out and an interlock S2—out, conductors 75 and 76 and the actuating coil of the switch S to the negative conductor 56.

However, before the switch S can be closed, the contact segment 146 of the device PK becomes disconnected from conductor 147, whereby the actuating coils S1 to R4, inclusive, are deënergized and the corresponding switches are opened.

The actuating coils of the switches P and G are simultaneously deënergized as soon as the switch S closes, as explained below, by reason of the disconnection of the contact segment 146 from the conductor 147. The switch S is thus closed, in accordance with the circuit just traced, as soon as the switches R4 and S2 have been opened, to permit the inclusion of interlocks R4—out and S2—out in circuit between the conductors 74 and 75.

It should be observed that the switches P and G cannot open until the switch S is closed by reason of an auxiliary holding circuit that comprises conductors 144 and 144ª, interlocks S—out and P—in, and the switch-actuating coils, as previously described. Thus, the switches P and G remain closed until the switch S and the transition resistor TR are included in circuit, thereby obviating an open-circuit type of transition. A similar result is secured in case a train operator wishes to reconnect the series-related regenerative machines in parallel relation, to obtain a higher speed on a down grade, for example. In such a case, the switch S cannot open before the closure of switches P and G, because of an auxiliary holding circuit comprising conductors 144 and 144ª, interlocks P—out and S—in, and the actuating coil of the switch S, as already set forth, thereby again precluding the possibility of an open-circuit transition. The interlocking features just recited in themselves form no part of my present invention, but are set forth and claimed in my co-pending application Serial No. 83,732, filed Mar. 13, 1916.

It will thus be seen that the transition of the regenerating machines from parallel to series relation has been effected by inserting the resistor AR in circuit, and opening the switches P and G, after closing the switch S, which completes a main circuit including the transition resistor TR, since the switches S1 and S2 have been opened, between the armatures A1 and A2, as already described in connection with the acceleration of the motors. In this way, the switch S and the variable resistor TR are employed to effect a different type of transition from the "shunting" transition that is utilized in connection with the series-parallel accelerating transition of the motors. Although the well-known "bridging" transition, wherein each of a pair of motors is temporarily "bridged" across a suitable resistor, is not illustrated in connection with my invention, it follows, however that a "bridging" type of transition is employed, by reason of the fact that neither of the machines is temporarily short-circuited, as is characteristic of "shunting" transition, but each machine armature is bridged across the switch S and the transition resistor TR, and the conditions of the two motors are maintained substantially identical during the transition, as is characteristic of the familiar "bridging" transition.

The two "bridging" circuits may be traced as follows: One circuit is established from the left-hand terminal of the armature A1 through conductors 82 and 132, switch P, conductor 133, transition resistor TR, switch S, conductor 88, contact segment 154 of the change-over switch CO, and conductor 83 to the other terminal of the armature A1.

The second circuit is established from the left-hand terminal of the armature A2 through conductor 89, transition resistor TR, switch S, conductors 88 and 128, switch G, conductors 129 and 155, switch #1, conductor 156, contact segment 151, which engages control finger 152 in positions $f''$ to $k''$ of the controller PK, thus connecting the resistors RR1 and RR2 in parallel relation, whence circuit is continued through conductor 162, switch #2, and conductors 161, 160 and 90 to the other terminal of the armature A2.

Figure 8:
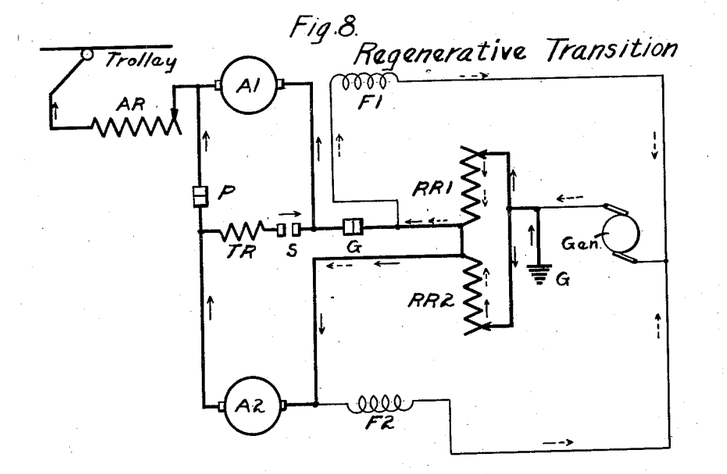
Figure 9:
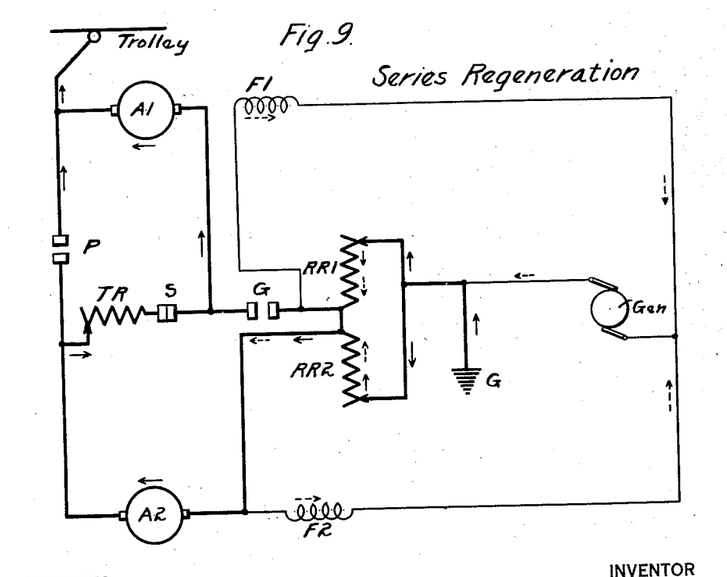

The simplified "bridging" transition connections are shown in Fig. 8 and the simplified connections for series regeneration in Fig. 9.

During the movement of the device PK from position $e''$ to position $f''$, a contact segment 206 engages control finger 207, and, as soon as the device PK reaches its position $f''$, a circuit is completed from the conductor 183 through contact segment 206, control finger 207, interlock S—in, and conductor 185 to the actuating coil "off", as previously traced, thus again permitting intermittent or step-by-step actuating of the controlling device PK in accordance with the operation of the master controller MC, by reason of the successive engagement of the contact segment 172 thereof with the corresponding control fingers. Upon the closure of switch S, a circuit is completed from the contact segment 146, through conductor 208, contact member 3—CO—Reg., interlock S—in, and conductor 209 to conductor 104, thereby effecting the progressive closure of the switches S1 to R4, inclusive as already explained.

The device PK is actuated, in the manner indicated, through the remaining positions $g''$ to $k''$, which latter position corresponds to full series relation of the regenerating machines, whereby the resistors RR1 and RR2 are gradually excluded from circuit to correspondingly strengthen the excitation of the field winding from the generator armature of the dynamotor, and thus maintain a substantially constant value of regenerated current, provided that the master controller MC is actuated by the train operator in a proper manner.

However, if, at any time, the train operator should actuate the master controller too rapidly, so that excessive regenerated voltage and currents would tend to be produced, then the relay device L, the actuating coil of which is connected in circuit with the resistor RR2, lifts to open the circuit between conductor 185 and the interlock #2—in, whereby the actuating coil "off" of the valve 29 is deënergized, and movement of the controlling device PK is arrested until the relay device L again drops to its lower position. Consequently, the relay device L, although of a construction that is similar to the familiar limit switch, does not perform the same function as such a switch, but is employed rather as an overload safety device in case the train operator improperly manipulates the regenerative system. Such a use of the relay device L in conjunction with a system of the general class under consideration is more fully shown and described and is claimed in my above-identified copending application.

It will thus be seen that I have provided a relatively simple and inexpensive method for employing a switching device and a variable resistor in effecting the familiar "shunting" transition of accelerating motors from series to parallel relation and in effecting a "bridging" type of transition of the regenerating machines from parallel to series relation, or vice versa.

I do not wish to be restricted to the specific circuit connections or location and arrangement of parts herein set forth, as various modifications thereof may be made without departing from the spirit and scope of my invention, and I wish it to be understood that the use of my invention is not limited to the particular system that has been described. I desire, therefore, that only such limitations shall be imposed as are indicated in the appended claims.

I claim as my invention:

1. In a system of control, the combination with a supply circuit and a plurality of dynamo-electric machines adapted for both acceleration and regeneration, of the same switching means for effecting "shunting" transition during acceleration of the machines and for effecting a different type of transition of the machines during the regenerative period.

2. In a system of control, the combination with a supply circuit and a plurality of dynamo-electric machines adapted for both acceleration and regeneration, of the same switching means including a variable resistor for effecting "shunting" transition during acceleration of the machines and for effecting a "bridging" transition of the machines during the regenerative period.

3. In a system of control, the combination with a supply circuit and a plurality of dynamo-electric machines adapted for both acceleration and regeneration, of a switching device and a variable resistor connected intermediate the machines during series acceleration thereof, means for excluding said resistor from circuit to effect a predetermined degree of machine acceleration, means for effecting the exclusion of said switching device and said resistor from circuit during "shunting" transition of the machines to parallel relation, means for effecting initial parallel regeneration of said machines, means for effecting the inclusion of said switching device and said resistor in circuit during a "bridging" transition of the machines to series relation, and means for subsequently excluding said resistor from circuit.

4. In a regenerative system of control, the combination with a supply circuit and a plurality of dynamo-electric machines adapted for regeneration and severally having armatures and field windings, of switching means for initially directly connecting the higher-voltage terminals of said armatures, switching means for initially connecting the lower-voltage terminal of the first armature to the negative supply-circuit conductor, means for connecting the lower-voltage terminal of the second armature to said conductor throughout the regenerative period, whereby said armatures are initially connected in parallel relation, a variable resistor and initially open switching means in series relation therewith, and means for opening said first two switching means and substantially simultaneously closing said last switching means to effect parallel-series transition of said armatures.

5. In a regenerative system of control, the combination with a direct-current supply circuit and a plurality of dynamo-electric machines adapted for regeneration and severally having armatures and field windings, of a variable resistor connected intermediate the positive supply-circuit conductor and the machines, switching means for initially directly connecting the higher-voltage terminals of said armatures during regeneration, switching means for concurrently connecting the lower-voltage terminals of the first armature to the negative supply-circuit conductor, means for connecting the lower-voltage terminal of the second armature to said conductor throughout the regenerative period, whereby said armatures are initially connected in parallel relation, a second variable resistor and initially open switching means in series relation therewith between said armatures, means for opening said first two switching means after closing said last switching means to effect parallel-series transition of said armatures, and independent means for varying the values of said resistors as the machine speed varies.

6. The method of regeneratively operating a plurality of momentum-driven dynamo-electric machines severally having armatures and field windings that consists in initially directly connecting the higher-voltage terminals of said armatures, concurrently connecting the lower-voltage terminal of the first armature to the negative supply-circuit conductor, the lower-voltage terminal of the second armature being connected to said conductor throughout the regenerative period, whereby said armatures are initially connected in parallel relation, connecting a variable resistor in series relation between said armatures and substantially simultaneously disconnecting the higher-voltage armature terminals and disconnecting the lower-voltage terminal of said first armature from said negative supply-circuit conductor to effect parallel-series transition of the machines.

7. In a regenerative system of control, the combination with a supply-circuit and a plurality of dynamo-electric machines severally having armatures and field windings, of switching means for initially directly connecting the higher-voltage terminals of said armatures, second switching means for concurrently connecting the lower-voltage terminal of the first armature to the negative supply-circuit conductor, a transition resistor and initially open switching means in series relation therewith between said armatures, a plurality of variable resistors connected in circuit with the respective armatures, a controller for varying the active value of said variable resistors, means for closing said last switching means before opening the other switching means to bridge the first armature through said transition resistor and said first switching means and to bridge the second armature through said second switching means, said controller and said transition resistor, whereby a "bridging" parallel-series transition is effected.

In testimony whereof, I have hereunto subscribed my name this 31st day of Jan. 1916.

ARTHUR J. HALL.